(12) United States Patent
Nilosek et al.

(10) Patent No.: US 11,443,452 B2
(45) Date of Patent: Sep. 13, 2022

(54) USING SPATIAL FILTER TO REDUCE BUNDLE ADJUSTMENT BLOCK SIZE

(71) Applicant: Pictometry International Corp., Rochester, NY (US)

(72) Inventors: David R. Nilosek, Rochester, NY (US); Vincent Caux-Brisebois, Rochester, NY (US); Phillip Salvaggio, Rochester, NY (US)

(73) Assignee: Pictometry International Corp., Rochester, NY (US)

( * ) Notice: Subject to any disclaimer, the term of this patent is extended or adjusted under 35 U.S.C. 154(b) by 40 days.

(21) Appl. No.: 16/895,858

(22) Filed: Jun. 8, 2020

(65) Prior Publication Data

US 2020/0388048 A1 Dec. 10, 2020

Related U.S. Application Data

(60) Provisional application No. 62/858,728, filed on Jun. 7, 2019.

(51) Int. Cl.
*G06T 7/73* (2017.01)
*G06V 20/13* (2022.01)

(52) U.S. Cl.
CPC ............... *G06T 7/73* (2017.01); *G06V 20/13* (2022.01); *G06T 2207/10028* (2013.01); *G06T 2207/10032* (2013.01); *G06T 2207/30204* (2013.01)

(58) Field of Classification Search
CPC ............. G06T 7/73; G06T 2207/10028; G06T 2207/10032; G06T 2207/30204;
(Continued)

(56) References Cited

U.S. PATENT DOCUMENTS 7,352,386 B1 4/2008 Shum et al.
8,442,307 B1 5/2013 Anati et al.
(Continued)

FOREIGN PATENT DOCUMENTS

WO WO 2017/037423 A1 3/2017

OTHER PUBLICATIONS

ESRI, Getting Started with ArcGIS, 2005, available at: <http://downloads.esri.com/support/documentation/ao_/1003Getting_Started_with_ArcGIS.pdf >, downloaded on Sep. 1, 2019 (Year: 2005).
(Continued)

*Primary Examiner* — Jerome Grant, II
(74) *Attorney, Agent, or Firm* — Dunlap Codding, P.C.

(57) ABSTRACT

Systems and methods are disclosed for using spatial filter to reduce bundle adjustment block size, including a method comprising: assigning a plurality of feature tracks to a voxel corresponding to a region of a geographic area, the voxel having a length, a width and a height, each feature track including a geographic coordinate within the region, a first image identifier identifying a first image, a second image identifier identifying a second image, a first pixel coordinate identifying a first location of a first feature in the first image, and a second pixel coordinate identifying a second location of the first feature within the second image; determining a quality metric value of the feature tracks assigned to the voxel; and conducting bundle adjustment on a subset of the feature tracks assigned to the voxel, the subset of the feature tracks based on the quality metric value.

16 Claims, 17 Drawing Sheets

(58) Field of Classification Search
CPC .. G06T 2207/30181; G06T 2207/30244; G06T 7/74; G06K 9/0063
USPC .......................................................... 382/103
See application file for complete search history.

(56) References Cited

U.S. PATENT DOCUMENTS

| | | | |
|---|---|---|---|
| 8,861,785 B2 | 10/2014 | Oi et al. | |
| 9,071,829 B2 | 6/2015 | Michot et al. | |
| 9,465,976 B1 | 10/2016 | Schpok et al. | |
| 9,488,492 B2 | 11/2016 | Samarasekera et al. | |
| 9,607,219 B2 | 3/2017 | Greveson et al. | |
| 9,679,381 B2 | 6/2017 | Martini | |
| 10,186,049 B1 | 1/2019 | Boardman et al. | |
| 10,339,663 B2 | 7/2019 | Barajas Hernandez et al. | |
| 2008/0137940 A1* | 6/2008 | Kakinami | G06T 7/593 382/154 |
| 2014/0300686 A1 | 10/2014 | Campbell et al. | |
| 2015/0213617 A1* | 7/2015 | Kim | G06K 9/00798 382/103 |
| 2016/0005097 A1 | 1/2016 | Hsiao et al. | |
| 2016/0027051 A1 | 1/2016 | Gross | |
| 2016/0048978 A1 | 2/2016 | Jachalsky et al. | |
| 2016/0267657 A1* | 9/2016 | Gupta | G06T 7/80 |
| 2016/0286130 A1* | 9/2016 | Ryu | G06T 5/003 |
| 2017/0046868 A1 | 2/2017 | Chernov et al. | |
| 2017/0308549 A1 | 10/2017 | Sims et al. | |
| 2018/0086284 A1* | 3/2018 | Gupta | G03B 43/00 |
| 2018/0218533 A1 | 8/2018 | Millin et al. | |
| 2019/0026919 A1* | 1/2019 | Aratani | G02B 27/0172 |
| 2019/0028688 A1* | 1/2019 | Kumar | G06K 9/4642 |
| 2019/0268519 A1* | 8/2019 | Cope | G06T 7/80 |
| 2021/0082137 A1* | 3/2021 | Wang | G06T 7/74 |

OTHER PUBLICATIONS

Holt, Alec, "Spatial similarity and GIS: the grouping of spatial kinds," 1999, available at: < https://pdfs.semanticscholar.org/1ff7/49c905db58bb884a9d6609de9452edf7921b.pdf >, downloaded on Sep. 1, 2019 (Year: 1999).

Artificial Neural Networks Technology, [online], archived on Nov. 23, 2015, available at:<https://web.archive.org/web/20151123211404/http://www2.psych.utoronto.ca/users/relngold/course> (Year: 2015).

Marr, Bernard, "A Short History of Machine Learning—Every Manager Should Read," [online], Feb. 19, 2016, available at: < https://www.forbes.com/sltes/bernardmarr/2016/02/19/a-short-history-of-machine-learning-every-manager-should-read/#70f07e5415e7 > (Year: 2016).

Recker et al., "Depth Data Assisted Structure-from-Motion Parameter Optimization and Feature Track Correction", IEEE Applied Imagery Pattern Recognition Workshop (AIPR), pp. 1-9, 2014.

Fadaeieslam et al., "Efficient Key Frames Selection for Panorama Generation from Video", Journal of Electronic Imaging, 2011.

European Patent Office acting as the International Search Authority, International Search Report and Written Opinion for PCT Application No. PCT/US2020/036671, dated Sep. 24, 2020.

\* cited by examiner

USING SPATIAL FILTER TO REDUCE BUNDLE ADJUSTMENT BLOCK SIZE

CROSS-REFERENCE TO RELATED APPLICATIONS

The present patent application claims priority to the provisional patent application identified by U.S. Ser. No. 62/858,728, titled "USING SPATIAL FILTER TO REDUCE BUNDLE ADJUSTMENT BLOCK SIZE," filed on Jun. 7, 2019, the entire contents of which are hereby expressly incorporated by reference herein.

BACKGROUND

Aerial Triangularization can be used to create a point cloud from a set of overlapping images by determining feature points shown in the overlapping images and determining a three-dimensional location of the feature points using what is known in the art as camera pose data of each of the overlapping images. A candidate feature point is the depiction of a same object in two or more of the overlapping images. The same object can be virtually anything that can be identified in at least two overlapping images.

In a traditional aerial survey system, camera pose data describes intrinsic (interior) and extrinsic (exterior) parameters of the camera(s). Intrinsic parameters include focal length, principal point, radial distortion, and other parameters describing the camera used to capture the image. Extrinsic parameters typically define the 3D position and pose of a camera for each frame, for example using six parameters (x, y, and z absolute position parameters; and w, 4, and K rotational (pose) parameters). The six parameters for the frames captured during a survey are usually bundle adjusted as part of an aerial triangulation process in order to produce a refined solution for the parameters to an acceptable error threshold, typically using a reprojection error of 3D object space tie points and their corresponding observed features in image space. In performing aerial triangularization, any errors with the camera pose data can cause errors in determining the three-dimensional location of the feature points. Thus, it is desirable for the camera pose data to be as accurate as possible.

Typically, an aerial camera system uses global shutter (GS) type CMOS or CCD sensors because the entire sensor is exposed at the same time. However, such global shutter sensors require significant circuitry that results in a reduction in the available area for light capture, have relatively low radiometric performance, and require relatively high-power consumption, which ultimately reduces maximum frame rates and increases costs. An alternative to global shutter type sensors, and by far the majority of imaging sensors currently in use, are electronic rolling shutter (RS)-type sensors, due to lower cost and superior performance.

In aerial triangularization, a large number of overlapping images are collected which collectively depict a particular geographic region. Feature points are identified and the two-dimensional location of the feature point in each of at least two overlapping images is extracted and matched. The matched feature points are converted to feature tracks and are triangulated to obtain an initial three-dimensional location of each of the feature tracks. The triangulated feature tracks are sent to a bundle adjustment process to adjust and refine the camera pose data for each of the images. Once the camera pose data is refined, the feature tracks can be analyzed again by an aerial triangulation process to obtain three dimensional locations of the feature points having an increased accuracy in comparison to the initial three-dimensional locations.

A manual process can be used to identify feature points and then generate feature tracks; however, this process is extremely time consuming and results in very few feature points per image. With few feature points per image, the density of the point cloud after bundle adjustment is diminished, resulting in a lower resolution point-cloud.

Feature tracks have also been automatically generated. There is, however, often a large amount of error in this process. The prior method for creating feature tracks is to generate as many as possible. However, this process often leads to having many tens of thousands of feature points per image. These feature points are then matched and triangulated to create a block of feature tracks. The number of feature tracks created in this process is difficult to predict. Performing a bundle adjustment on a large block of feature tracks is both computationally expensive and time consuming; however, if there are too few feature tracks or poor spatial distribution when the bundle adjustment is performed, the results will lead to a poor adjustment. Finally, the feature tracks may contain bad matches and therefore lead to erroneous world point coordinates that create outliers in the bundle adjustment and increase the error of the solution.

One method known to increase the speed of a bundle adjustment is to remove images or remove measurement data from an image if there are other images that contain the same feature points. For example, if four images show at least one common feature point, the image with the fewest other feature points may be removed. While removal of images from consideration will speed the bundle adjustment process, there are a number of issues it creates. First, this method may arbitrarily lower the number of feature points in a feature track without considering the quality of the feature points, thereby increasing error in the bundle adjustment which would result in a low-quality point cloud solution. A second issue with this method is that it does not maintain a spatial distribution of feature tracks because instead of adjusting the number of feature tracks to adjust the spatial distribution, it adjusts the number of feature points which lowers the quality of the feature track. Another issue is that this method does not account for a poor-quality feature point match when generating feature tracks. It instead would remove all feature points enclosed in the image which results in numerous feature tracks arbitrarily losing feature points. Lastly, this method does not account for adjusting a quality metric value based on the reprojection error of a feature track.

Another method known to increase the speed of the bundle adjustment process is to reduce the number of feature tracks before an initial triangularization. This method, however, does not maintain a spatial distribution of feature tracks across the geographic area being imaged.

Another method known to reduce the speed of the bundle adjustment process is to reduce the number of feature tracks based on the reprojection error. Strict reprojection error-based filtering, however, would leave the aerial triangularization process vulnerable to excluding relevant areas in favor of feature-dense areas, whereas simple spatial filtering methods such as maxi-min would favor features in low-density areas to the detriment of quality. In effect this method fails to maintain spatial distribution across the geographic area and fails to ensure a quality bundle adjustment.

What is needed is an automated method and system of selecting the highest quality feature tracks while maintaining spatial distribution across the geographic area to ensure a quality bundle adjustment and greatly increase the speed of the aerial triangularization process in creating a point cloud of a geographic region.

SUMMARY

The problem of automating the selection of feature tracks while ensuring a spatially distributed, and high quality bundle adjustment is solved with the methods and systems described herein, including a method comprising assigning feature tracks to a voxel corresponding to a region of a geographic area; determining a quality metric value of the feature tracks assigned to the voxel; and conducting a bundle adjustment on a subset of the feature tracks assigned to the voxel.

In one aspect of the present disclosure, a method for using spatial filter to reduce bundle adjustment block size may comprise: assigning a plurality of feature tracks to a voxel corresponding to a region of a geographic area, the voxel having a length, a width and a height, each feature track including a geographic coordinate within the region, a first image identifier identifying a first image, a second image identifier identifying a second image, a first pixel coordinate identifying a first location of a first feature in the first image, and a second pixel coordinate identifying a second location of the first feature within the second image; determining a quality metric value of the feature tracks assigned to the voxel; and conducting bundle adjustment on a subset of the feature tracks assigned to the voxel, the subset of the feature tracks based on the quality metric value.

In one aspect of the present disclosure, a computer system for using spatial filter to reduce bundle adjustment block size may comprise one or more processor and one or more non-transitory computer readable medium storing computer executable instructions that when executed by the one or more processors cause the one or more processors to: assign a plurality of feature tracks to a voxel corresponding to a region of a geographic area, the voxel having a length, a width, and a height, each feature track including a geographic coordinate within the region, a first image identifier identifying a first image, a second image identifier identifying a second image, a first pixel coordinate identifying a first location of a first feature in the first image, a second pixel coordinate identifying a second location of the first feature within the second image; determine a quality metric value of the feature tracks assigned to the voxel; and conduct bundle adjustment of a subset of the feature tracks assigned to the voxel, the subset of the feature tracks being based on the quality metric values.

In one aspect of the present disclosure, the method may further comprise and/or the one or more processor may be caused to carry out, sorting the feature tracks assigned to the voxel by the quality metric value; creating the subset of the feature tracks by determining whether a quantity of feature tracks assigned to the voxel exceeds a feature track quantity threshold, and assigning highest quality feature tracks to the subset based on the quality metric value; and/or sorting the feature tracks assigned to the voxel by the quality metric value.

In one aspect of the present disclosure, determining the quality metric value may comprise one or more of the following: determining a feature track triangularization quality, determining a feature point quantity in the feature track, determining a quantity of feature tracks in the voxel, determining a distance of the feature track from a camera, and/or determining a mean reprojection error for each feature track. In one aspect of the present disclosure, determining a mean reprojection error for each feature track may comprise determining a mean of the Euclidian distance between a reprojection point and a feature point of each feature point in the feature track; wherein the reprojection point is determined using metadata of each image to project the feature track geographic coordinate onto the image; and wherein the Euclidian distance is a distance between a location of the reprojection point on the image and the location of the feature point in the image.

In one aspect of the present disclosure, one or more point cloud or model may be generated based on the result of the bundle adjustment.

BRIEF DESCRIPTION OF SEVERAL VIEWS OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
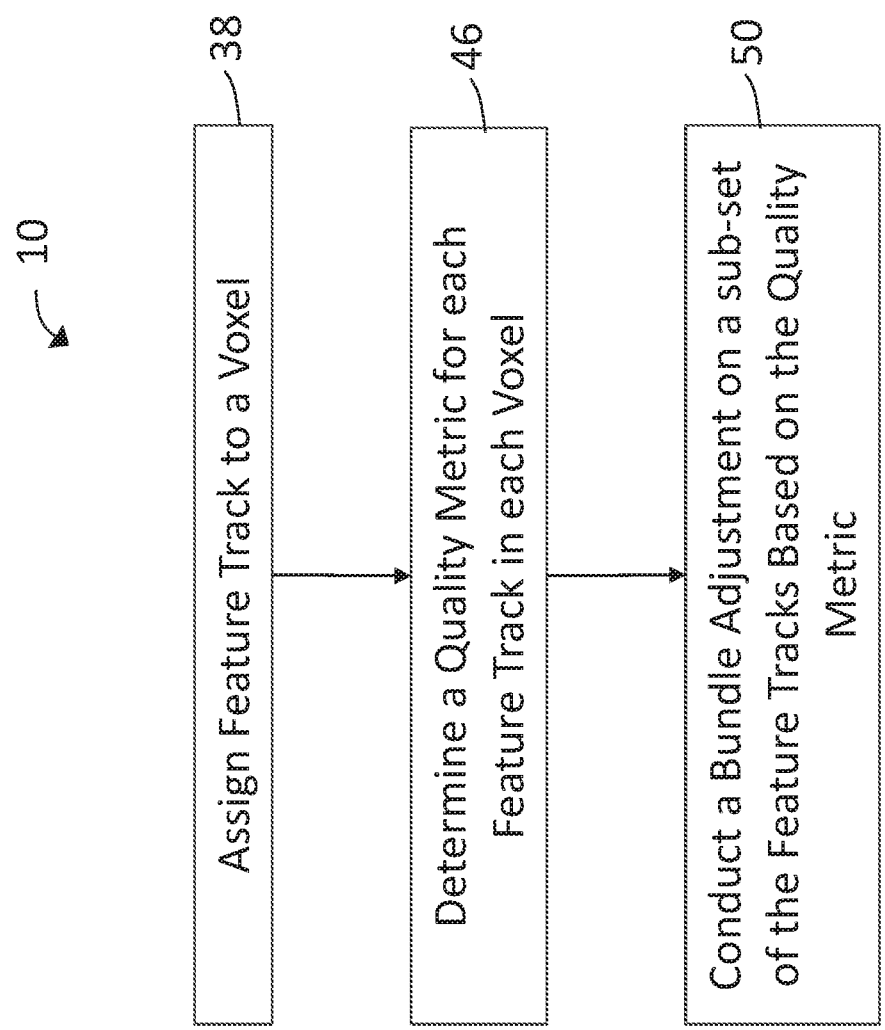
FIG. 1 is a process flow diagram of an exemplary embodiment of a spatial filter method in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. For instance, although a geographic area that includes man-made objects, non-exclusive examples of which include buildings and infrastructure including roads, bridges, utility lines, pipelines, utility towers may be used as an example, the methods and systems may be used to reduce the bundle adjustment block size of a plurality of images of any feature, including natural features. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software, which may be referred to as executable code or executable instructions, may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, magnetically based, and/or the like.

The problem of automating the selection of feature tracks while ensuring a spatially distributed, and high quality bundle adjustment is solved with the methods and systems described herein, including a method comprising assigning feature tracks to a voxel corresponding to a region of a geographic area; determining a quality metric value of the feature tracks assigned to the voxel; and conducting a bundle adjustment on a subset of the feature tracks having a quality above a threshold and assigned to the voxel.

Referring now to the drawings, FIG. 1 is a process flow chart depicting one embodiment of a spatial filter method 10 for increasing the distribution of feature tracks 12$a$-$n$ within a set 16 (See FIG. 3) of overlapping images 20$a$-$n$ (See FIG. 3) depicting a geographic area 24, while also reducing the number of feature tracks 12$a$-$n$ (See FIG. 4) used to conduct a bundle adjustment process by a computer system 30 (See FIG. 12) that is shown by way of example. Enhancing the spatial distribution of feature tracks 12$a$-$n$ while also reducing the number of feature tracks 12$a$-$n$ improves the operation of the computer system 30 in conducting the bundle adjustment, resulting in improved camera pose data using less computational resources.

As will be discussed in more detail below, the spatial distribution of feature tracks 12$a$-$n$ within the overlapping images 20$a$-$n$ is achieved by dividing the geographic area 24 into a plurality of voxels 34$a$-$n$ (See FIG. 9) with each of the voxels 34$a$-$n$ having geographic coordinates of a region of the geographic area 24. Then one or more feature track 12a-n having a geographic location within each voxel 34 is identified and assigned to the voxel 34 as shown, for example, in FIG. 9.

Generally, the spatial filter method 10 comprises assigning one or more feature track 12a-n to the voxel 34 corresponding to a region of the geographic area 24 as indicated by step 38. Then, a quality metric value is determined for each feature track 12a-n assigned to each voxel 34 as indicated by step 46. Then, a bundle adjustment is conducted on a subset of the feature tracks 12a-n assigned to each voxel 34 based on the quality metric value as indicated by step 50.

Figure 2:
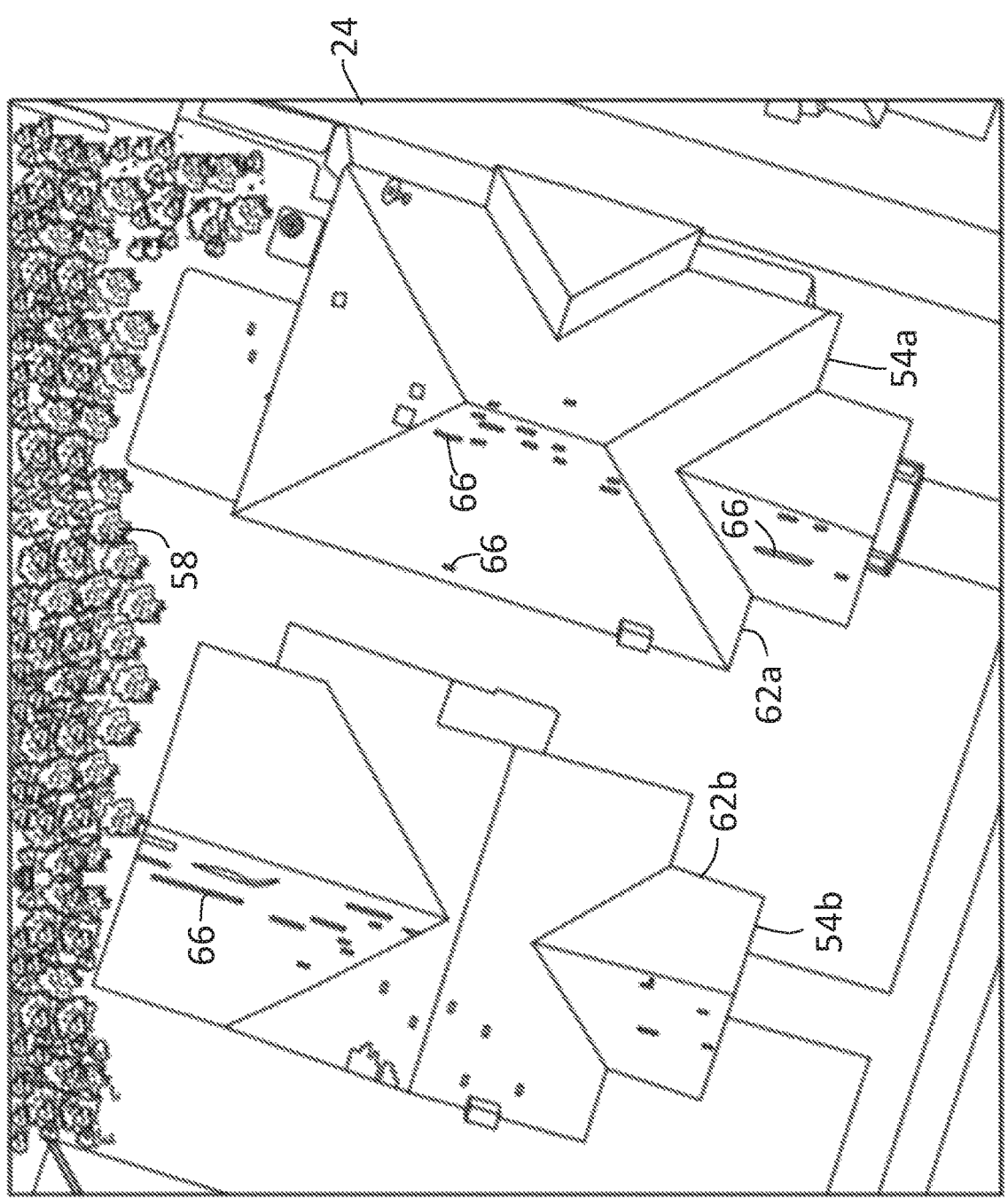
FIG. 2 is an exemplary aerial view of a geographic area.

Shown in FIG. 2 is an aerial view of the geographic area 24 that has been selected for analysis. The geographic area 24 can be any geographic area to be analyzed, and is shown by way of example as a section of a housing addition. The geographic area 24 may contain a numerous and diverse set of features such as houses 54a and 54b, or vegetation 58, such as trees or shrubs. Each of the houses 54a and 54b includes a house roof 62a and 62b. In some cases, one or more of the roofs 62a, 62b may include one or more flaw 66. The roofs 62a, 62b may have commonly identifiable features, such as a vertex, a corner of a roof plane, a point of a gable or hip, etc. In other examples, the geographic area 24 may be feature-sparse, that is, the geographic area 24 may include few if any identifiable or unique features. For example, a feature-sparse geographic area 24 may be a natural environment, such as a water basin or a uniform vegetation area like grasslands. In another example, the geographic area 24 may be considered feature sparse if the geographic area 24 includes many similar features in close proximity to one another which would increase the likelihood of incorrectly matched features.

Figure 3:
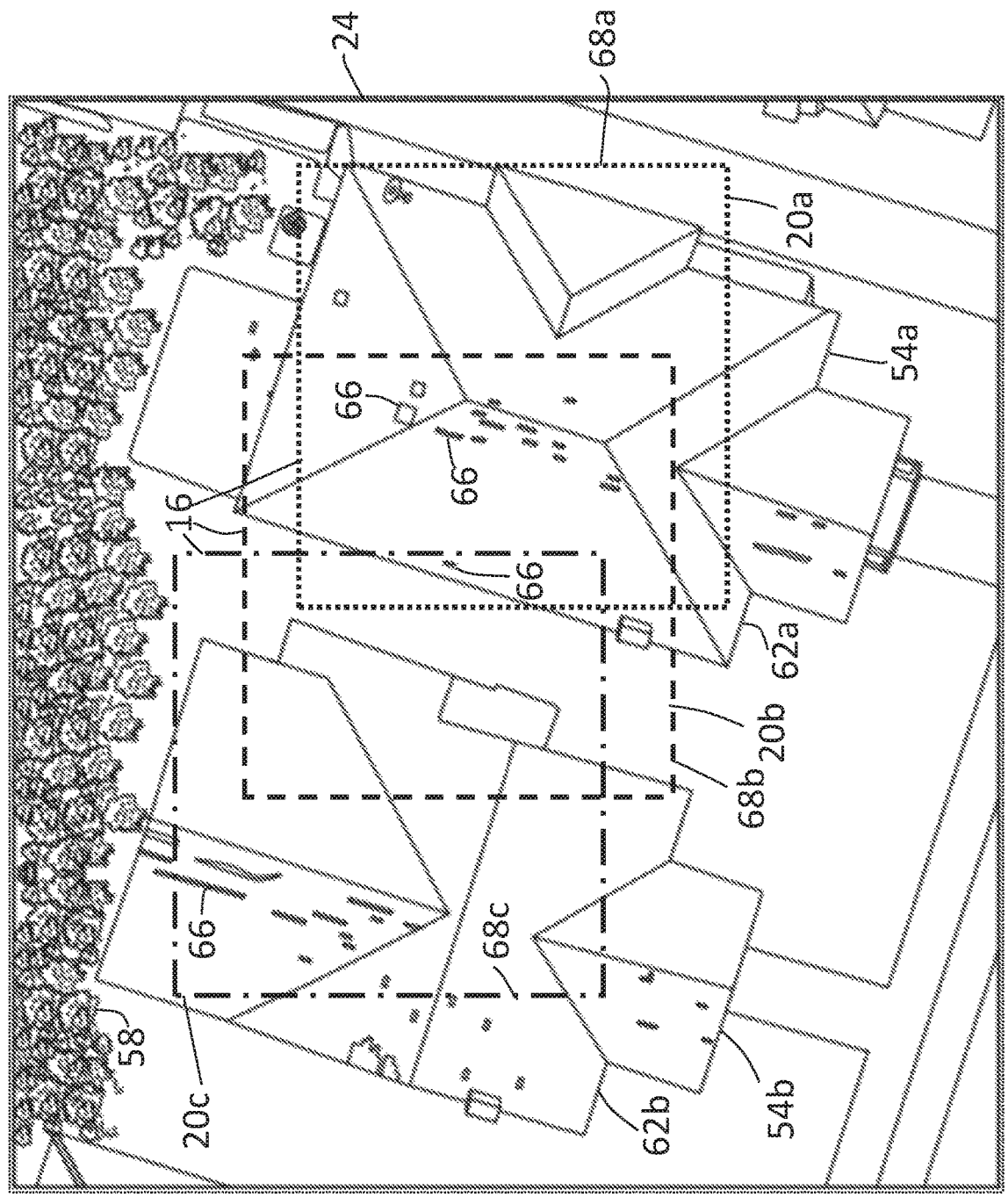
FIG. 3 is an exemplary aerial view of the same geographic area as in FIG. 2 showing three exemplary, overlapping images (a first image, a second image and a third image) with each of the overlapping images depicting a section of the geographic area.

As depicted in FIG. 3, in one embodiment, more than one overlapping image 20a-n is taken depicting sub-regions 68a-n of the geographic area 24. Each image 20a-n of the sub-region 68 of the geographic area 24 overlaps with at least one other image 20a-n. While in practice the number of images 20a-n may number in the millions, by way of example and for simplicity, FIG. 3 shows three images 20a, 20b, 20c (a first image 20a, a second image 20b, and a third image 20c) encompassing sub-regions 68a, 68b, and 68c. For example, the first image 20a overlaps with the second image 20b and the third image 20c. Likewise, the second image 20b overlaps with the first image 20a and the third image 20c; and the third image 20c overlaps with the first image 20a and the second image 20b.

As depicted in FIG. 3, in one embodiment, each of the images 20a-n may be taken of a geographic area 24 with a sensor, such as a camera, from an aerial perspective over the geographic area 24, or from a ground-based perspective. With respect to an aerial perspective, the images 20a-n can be from an overhead viewpoint, also referred to as an ortho view or nadir view, typically taken directly below and/or vertically downward from the camera lens positioned above the geographic area 24 (FIG. 2), or an aerial oblique view. An aerial oblique view may be taken from approximately 10 degrees to approximately 75 degrees from a nadir direction. In one embodiment, certain of the images 20a-n may be nadir, and some of the images may be captured from one or more oblique angles. For example, the first image 20a may be an aerial nadir image, the second image 20b may be an aerial oblique image taken from approximately 10 degrees from the nadir direction, and the third image 20c may be an aerial oblique image taken from approximately 20 degrees from the nadir direction.

In one embodiment, the sensor can be oriented and located in various orientations and locations, such as street view, satellite, automotive based, unmanned aerial vehicle based, and/or manned aerial vehicle based. The image data may contain nominal "visible-band" (red, green, blue) wavelength spectral data or other spectral bands data (for example, infrared wavelength spectral data). The images 20a-n can be captured independently at different instances of time, or at least some of the images 20a-n can be captured simultaneously using multiple cameras. The images 20a-n can be captured through the use of a global shutter in which all of the sensors within the camera are exposed simultaneously, a rolling shutter in which different scanlines in the sensor are exposed at different times, or combinations thereof. In one embodiment, one or more of the images 20a-n can be a synthetic global shutter image created from a rolling shutter image, or combinations thereof. An exemplary synthetic global shutter image is disclosed in the patent application identified by PCT/AU2017/051143 (Publication No. WO 2018/071983).

Exemplary image capture systems that can be used to capture the images 20a-n are disclosed in U.S. Pat. Nos. 7,424,133, 8,385,672, and U.S. Ser. No. 16/226,320 (published as U.S. Pub. No. US 2019-0149710 A1), the entire contents of each of which are hereby incorporated herein by reference.

In one embodiment, each of the images 20a-n may have a unique image identifier such as by use of metadata, or otherwise stored in such a way that allows a computer system 30 to definitively identify each of the images 20a-n.

Each of the images 20a-n has a plurality of pixels. In one embodiment, the images 20a-n may be geo-referenced, that is, processed such that pixels in the image 20a-n have a determined geo-location, such as x, y, and z coordinates and/or latitude, longitude, and elevation coordinates. See, for example, U.S. Pat. No. 7,424,133 that describes techniques for geolocating oblique images and measuring within the oblique images. The entire content of U.S. Pat. No. 7,424,133 is hereby incorporated herein by reference. Also see for example WO2018/071983, titled "An Image Synthesis System". The geo-location data can be stored as metadata within the images or stored separately from the images and related to the images using any suitable technique, such as unique identifiers.

Figure 4A:
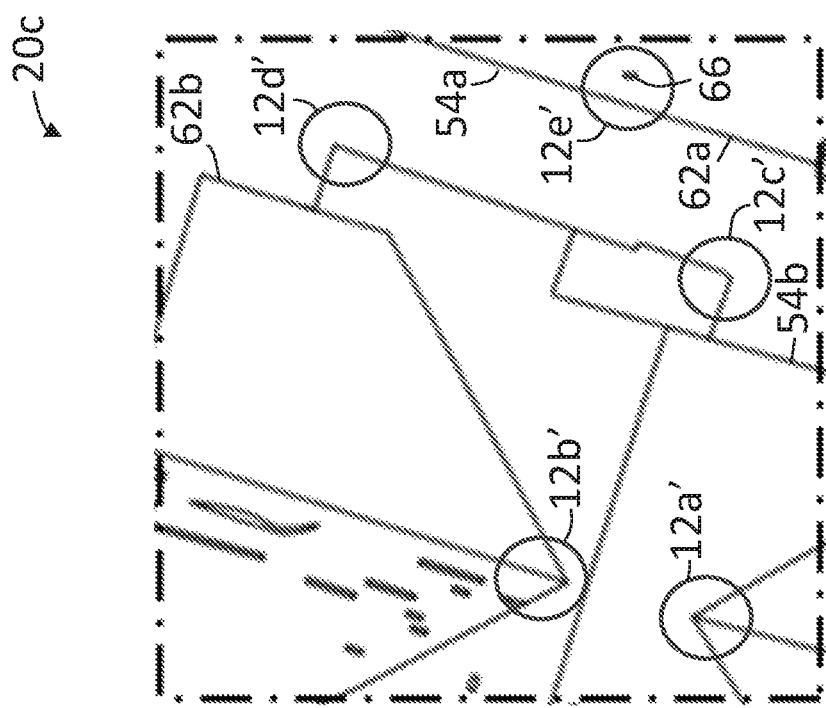
FIG. 4A is the first image (i.e., a left-most image) of FIG. 3 depicting a first exemplary selection of feature points.
Figure 4B:
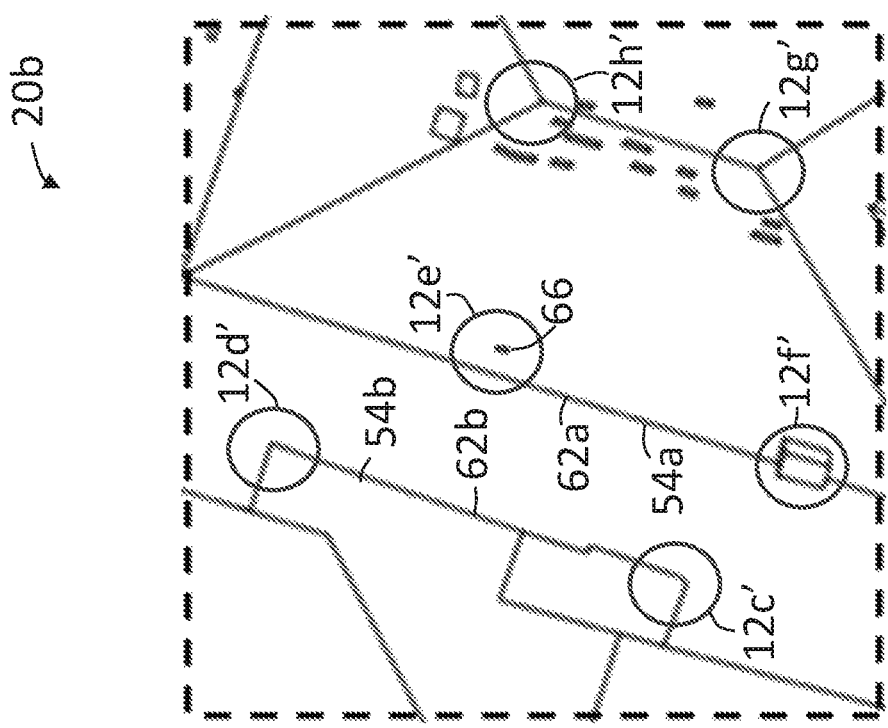
FIG. 4B is the second image (i.e., a center image) of FIG. 3 depicting a second exemplary selection of feature points.
Figure 4C:
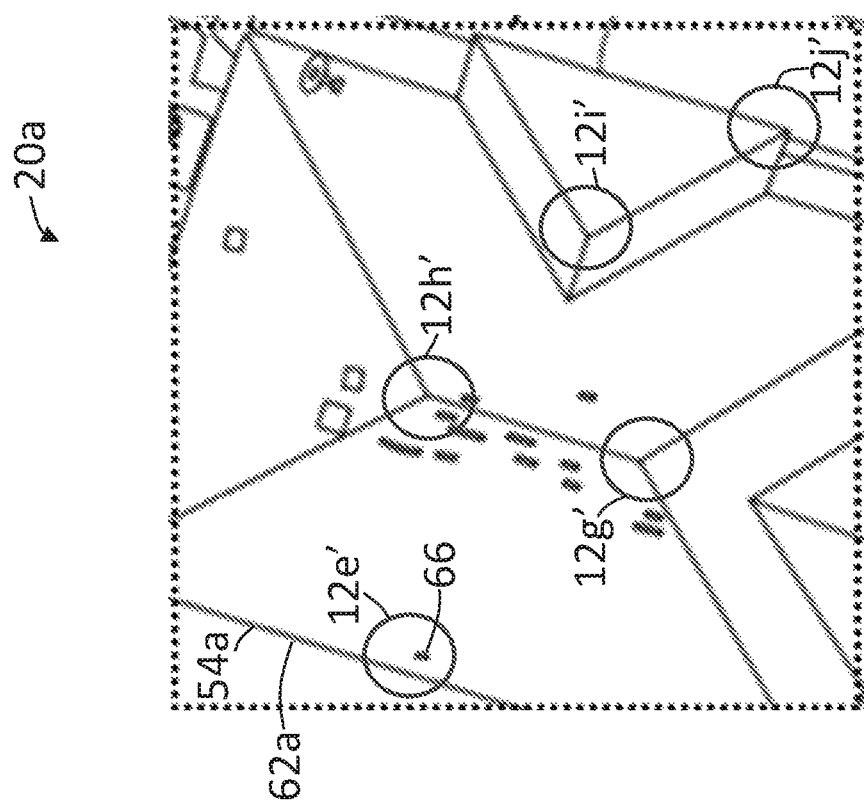
FIG. 4C is the third image (i.e., a right-most image) of FIG. 3 depicting a third exemplary selection of feature points.

Referring now to FIGS. 4A, 4B, and 4C, as part of the triangularization process, feature points 12a-n' are identified in each image 20a-n of geographic area 24. A feature point 12a-n' includes at least a pixel coordinate pair 70 (X, Y pixel coordinate), further described below (See FIG. 5), and a unique image identifier. As depicted in FIG. 4A, in one embodiment, the feature points 12a', 12b', 12c', 12d', and 12e' are identified in the image 20c. As depicted in FIG. 4B, in one embodiment, feature points 12c', 12d', 12e', 12f', 12g', and 12h' are identified in the image 20b. As depicted in FIG. 4C, in one embodiment, the feature points 12e', 12g', 12h', 12i', and 12j' are identified in the image 20a.

The feature points 12a-n' may be extracted from images 20a-n automatically by the computer system 30. The computer system 30 may extract one or more of the feature points 12a-n' in each image 20a-n independently of any other image 20a-n. Further, the computer system 30 may extract one or more of the feature points 12a-n' in each image 20a-n by estimating the feature points 12a-n' pixel coordinate pair 70 in a selected image 20 from a pixel coordinate pair 70 of a feature point 12a-n' in a different image 20. Each of the feature points 12a-n' specifies an identifiable feature within the image 20. For example, the feature points 12a', and 12b' identify vertices of the roof 62b.

The feature points 12c' and 12d' identify corners of a roof section of the roof 62b. And, the feature point 12e' identifies the roof flaw 66.

Figure 5:
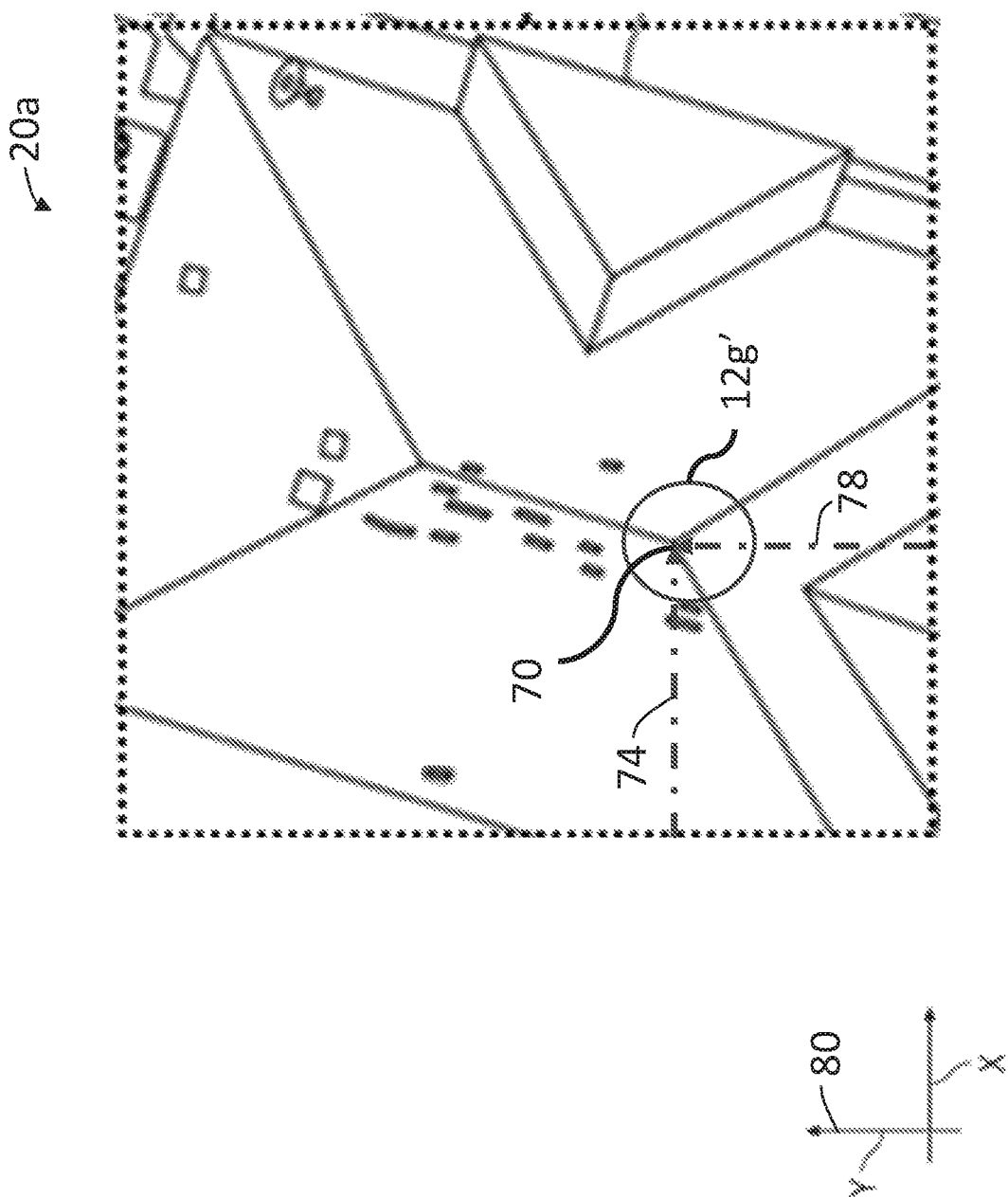
FIG. 5 is the third image of FIG. 4C depicting an exemplary determination of feature point pixel coordinates.

As depicted in FIG. 5, in one embodiment, each feature point 12a-n' is identified within at least two of the images with at least two pixel coordinate pairs 70 (e.g., one for each image 20). For example, the feature point 12g' pixel location within the image 20a is described as the number of pixels along the X axis 74 and the number of pixels along the Y axis 78. A cartesian key 80 is also shown in FIG. 5 for convenience in order to more easily illustrate possible directions for the X axis and Y axis. The cartesian key 80 shows an upwards direction (i.e. from the bottom of the image 20a to the row of pixels containing the feature point 12g') for counting the pixels in the Y axis and a rightwards direction (i.e. from the left side of the image 20a to the column of pixels containing the feature point 12g') for counting the pixels in the X axis. So long as the direction used for counting pixels along either the X axis or Y axis is consistent for all feature points 12a-n' across all images 20a-n in a bundle adjustment, the number of pixels along the Y axis 78 may be counted in one of either a downwards direction (i.e. from the top of the image 20 to the row of pixels containing the feature point 12a-n') or an upwards direction, and the number of pixels along the X axis 74 may be counted in one of either a leftwards direction (i.e. from the right of the image to the column of pixels containing the feature point 12a-n') or a rightwards direction. In the example shown in FIG. 5, feature point 12g' has pixel coordinates 70 of X230' and Y230'.

Figure 6A:
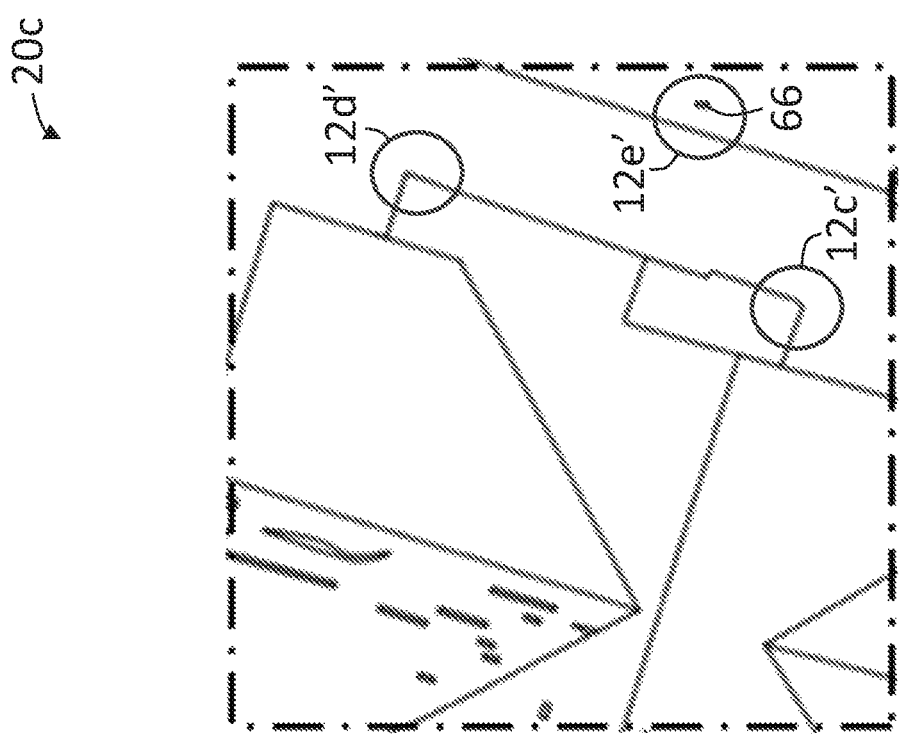
FIG. 6A depicts a portion of the first image of FIG. 4A showing only a first set of common feature points.
Figure 6B:
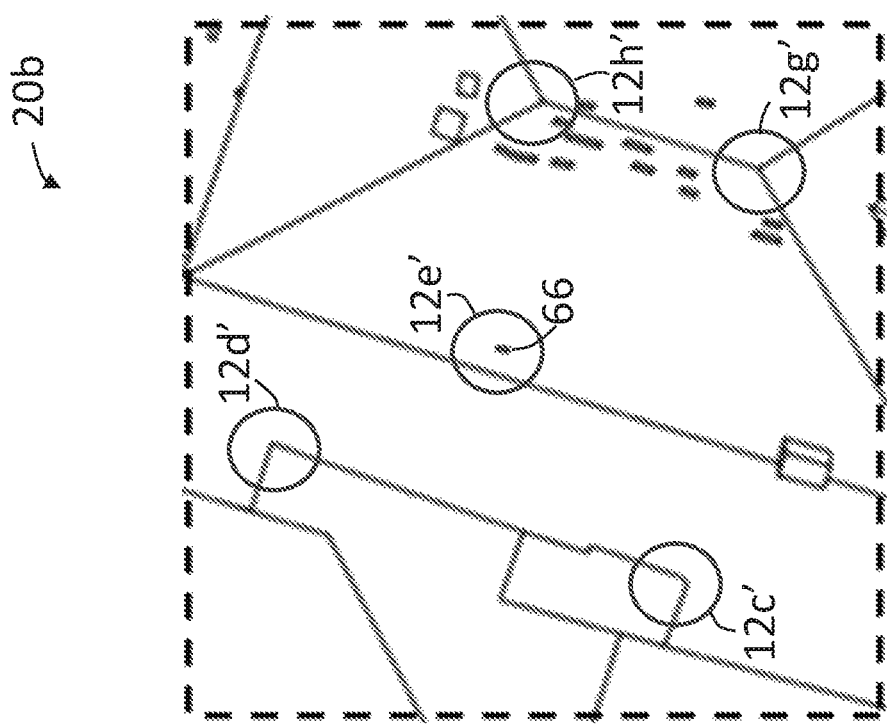
FIG. 6B depicts a portion of the image of FIG. 4B showing only a second set of common feature points.
Figure 6C:
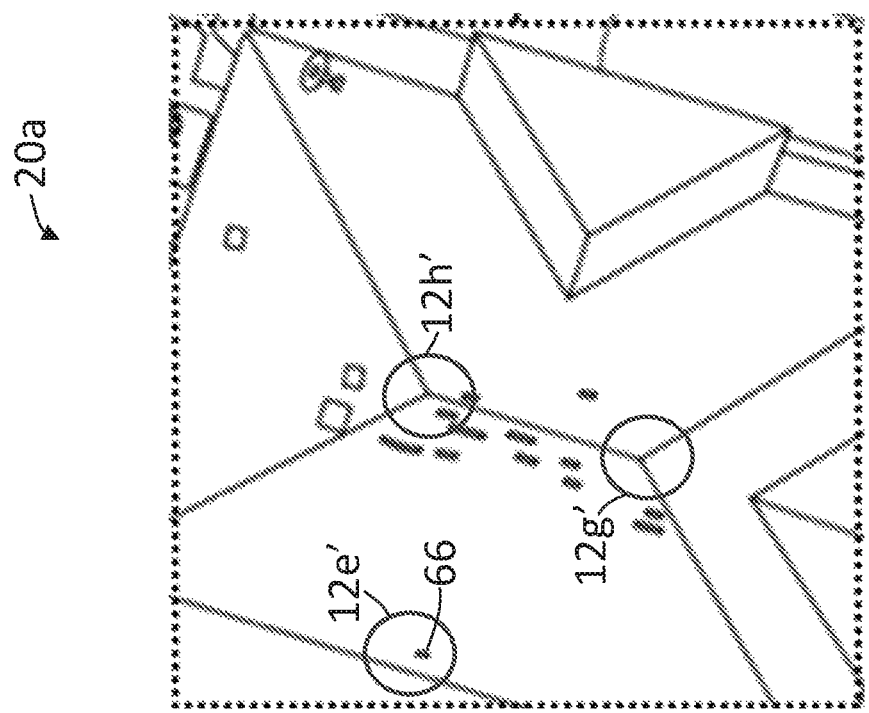
FIG. 6C depicts a portion of the image of FIG. 4C showing only a third set of common feature points.

As illustrated in FIGS. 6A, 6B, and 6C, in one embodiment, any of the plurality of feature points 12a-n' in any of the plurality of images 20a-n that is not matched to a feature point 12' in any other image 20a-n is removed. As shown in FIGS. 6A, 6B, and 6C, after removing one or more unmatched feature point 12', only matched feature points 12a-n' remain in each of the images 20.

FIGS. 6A, 6B, and 6C show a first set of matched feature points 12c', 12d', 12e' in the third image 20c and the second image 20b. The second image 20b and the first image 20a include a second set of matched features 12e', 12g', and 12h'. The first, second, and third images 20a, 20b, and 20c include a third set of matched features 12e'.

Figure 7:
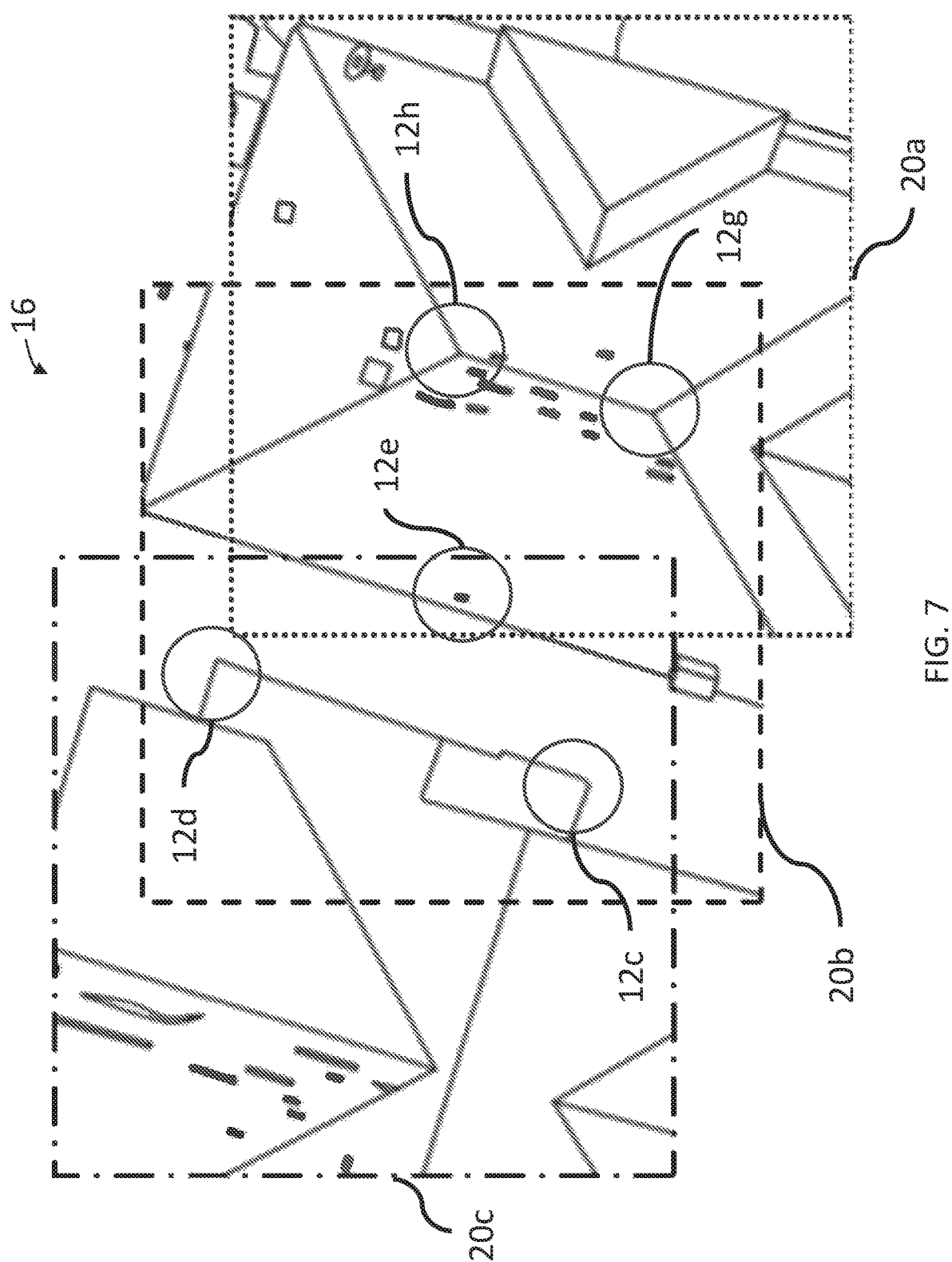
FIG. 7 is an illustration of the overlapping first, second, and third images of FIGS. 6A, 6B, and 6C and the combined first, second, and third sets of common feature points forming feature tracks

As depicted in FIG. 7, in one embodiment, multiple feature tracks 12c, 12d, 12e, 12g, and 12h are shown across multiple images 20a, 20b, 20c. Each feature track 12a-n is a set of at least a unique image identifier and pixel coordinate pair 70 of feature point 12a-n' in each image 20a-n containing feature point 12a-n' and a geographic coordinate. In other words, each feature track 12a-n includes at least two image identifiers identifying at least two images 20 where the feature track 12 is shown, at least two pixel coordinate pairs 70 of feature points 12', and an initial geographic coordinate. A geographic coordinate is a world point coordinate, that is, a geolocated point on the earth in any coordinate system. In one embodiment, a geographic coordinate may be triangulated by using location information calculated from the feature points 12' of a feature track 12.

As illustrated in FIG. 7, in one embodiment, the feature tracks 12c, 12d, and 12e are constructed by tracking feature points 12c', 12d', 12e' in the third image 20c and the second image 20b; the feature track 12e is constructed by tracking the feature point 12e' in the first, second, and third images 20a, 20b, and 20c; and the feature tracks 12e, 12g, and 12h are constructed by tracking the feature points 12e', 12g', 12h' in the second image 20b and the first image 20a.

Figure 8:
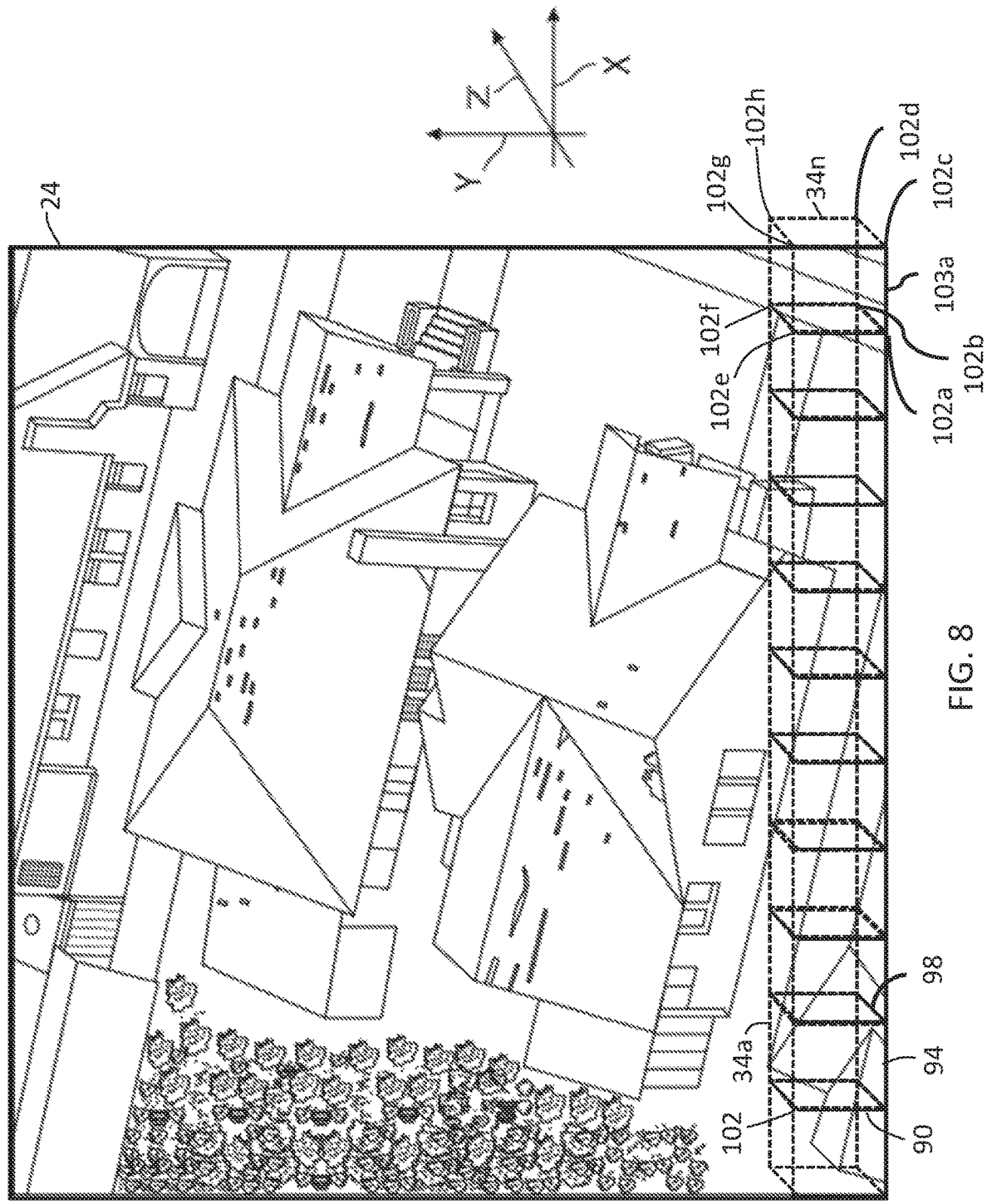
FIG. 8 is an illustration of a voxelated geographic area having exemplary voxels overlaid upon an oblique aerial view of the same geographic area as in FIG. 2.

As depicted in FIG. 8, in one embodiment, the geographic area 24 is voxelated by dividing the geographic area 24 into a plurality of voxels 34a-n. For purposes of clarity, not all of the voxels 34a-n are shown in FIG. 8. The voxels 34a-n can be arranged in a grid pattern, and may collectively overlie the entire geographic area 24. Each of the voxels 34a-n has a length 90, a width 94, and a height 98, which form a voxel volume of finite size. Each of the plurality of voxels 34a-n further has one or more geographic coordinate 102 corresponding to the region of the geographic area 24 enclosed by the voxel 34. In one embodiment, the length 90, width 94, and height 98 may be different, or may be congruent, that is, are each the same in length. In another embodiment, only the length 90 and width 94 are congruent while the height 98 is of a different length than the length 90 and width 94.

In one embodiment, the geographic coordinate 102 is a world point coordinate specified by three space coordinates, and optionally a time coordinate. The space coordinates can be latitude, longitude, and elevation. In one embodiment, the voxels 34a-n can be shaped as a parallelepiped, and each voxel 34a-n may be identified by eight geographic coordinates 102a-h that collectively define a boundary for the voxel 34a-n. The voxels 34a-n can have other shapes, such as a cylinder, a cone, a cube, a tetrahedron, an ellipsoid, a hexagonal prism, or the like. The number of geographic coordinates 102 to identify the voxels 34a-n may depend upon the shape of the voxels 34a-n. The geographic coordinates 102a-h are only shown for one of one of the voxels 34n for purposes of brevity.

In one embodiment, the geographic coordinates 102a-d can be obtained from a tessellated ground plane, for example. Methods for making and using the tessellated ground plane are disclosed, for example, in U.S. Pat. No. 7,424,133, which is incorporated herein by reference. Thus, a plane 103a defined by the geographic coordinates 102a-d would generally follow the terrain as defined in the tessellated ground plane.

The world point coordinate 102b may be directly above world point coordinate 102a. The world point coordinate 102f may be directly above world point coordinate 102e. The world point coordinate 102h may be directly above world point coordinate 102g. The world point coordinate 102d may be directly above world point coordinate 102c.

In the example shown, the voxels 34a-n are contiguous and do not overlap. In other embodiments, however, the voxels 34a-n may overlap.

In one embodiment, the length 90, width 94, and height 98 may be set based on the number of feature tracks 12 desired per voxel 34. By adjusting the voxel 34 volume and limiting the number of feature tracks 12 per voxel 34, the computational resources of the bundle adjustment per voxel 34 can decrease and the time needed to complete a bundle adjustment can decrease. In one embodiment, the length 90, width 94, and height 98 are automatically determined by the computer system 30. In another embodiment, the length 90, width 94, and height 98 are supplied by a user through any of a plurality of user devices 104. In an exemplary embodiment, the length 90, width 94, and height 98 can vary.

In one embodiment, adaptive voxels may be used.

Figure 9:
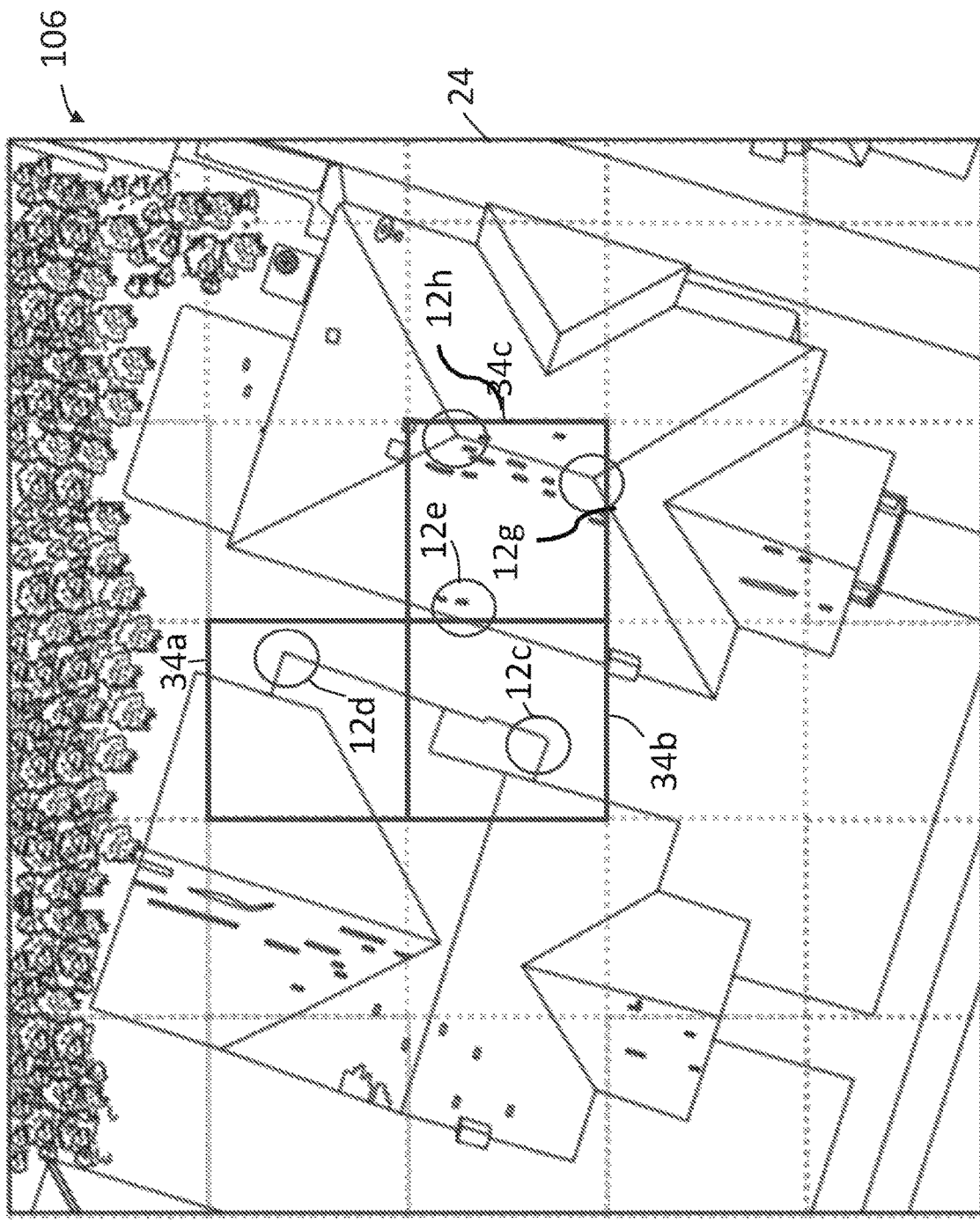
FIG. 9 is an illustration of an exemplary ortho (i.e., straight down) view of the voxelated geographic area of FIG. 8 showing voxels that contain feature tracks and the feature tracks positioned within the voxels.

FIG. 9 shows the voxels 34a-n overlaid on a nadir image 106 of the geographic area 24. For clarity, only three voxels 34a, 34v, and 34c are shown. As depicted in FIG. 9, in one embodiment, each of the one or more feature track 12a-n has a geographic location that is within a particular voxel 34. The feature tracks 12a-n are identified and assigned to a particular one of the voxels 34a-n (step 38). By way of example, in FIG. 9, feature track 12d is assigned to voxel 34a, feature track 12c is assigned to voxel 34b, and feature track 12e, 12g, 12h are assigned to voxel 34c.

In one embodiment, to assign the feature track 12 to the voxel 34, the feature track 12 is assigned a voxel geographic coordinate having at least an X value and Y value, then each feature track 12a-n having a geographic coordinate within a particular one of the voxels 34a-n is selected. The X value for the voxel geographic coordinate assigned to the feature track 12 may be calculated using the following formula: $X = L_{voxel} * floor(wp_X / L_{voxel})$ where $L_{voxel}$ is the length 90 of voxel 34, floor is a function that rounds down to the next lowest integer, and $wp_X$ is the feature track 12 geographic coordinate. Similarly, the Y value for the voxel geographic coordinate assigned to the feature track 12 may be calculated by using the formula: $Y = L_{voxel} * floor(wp_Y / L_{voxel})$ where $wp_Y$ is the feature track 12 geographic coordinate.

Figure 10:
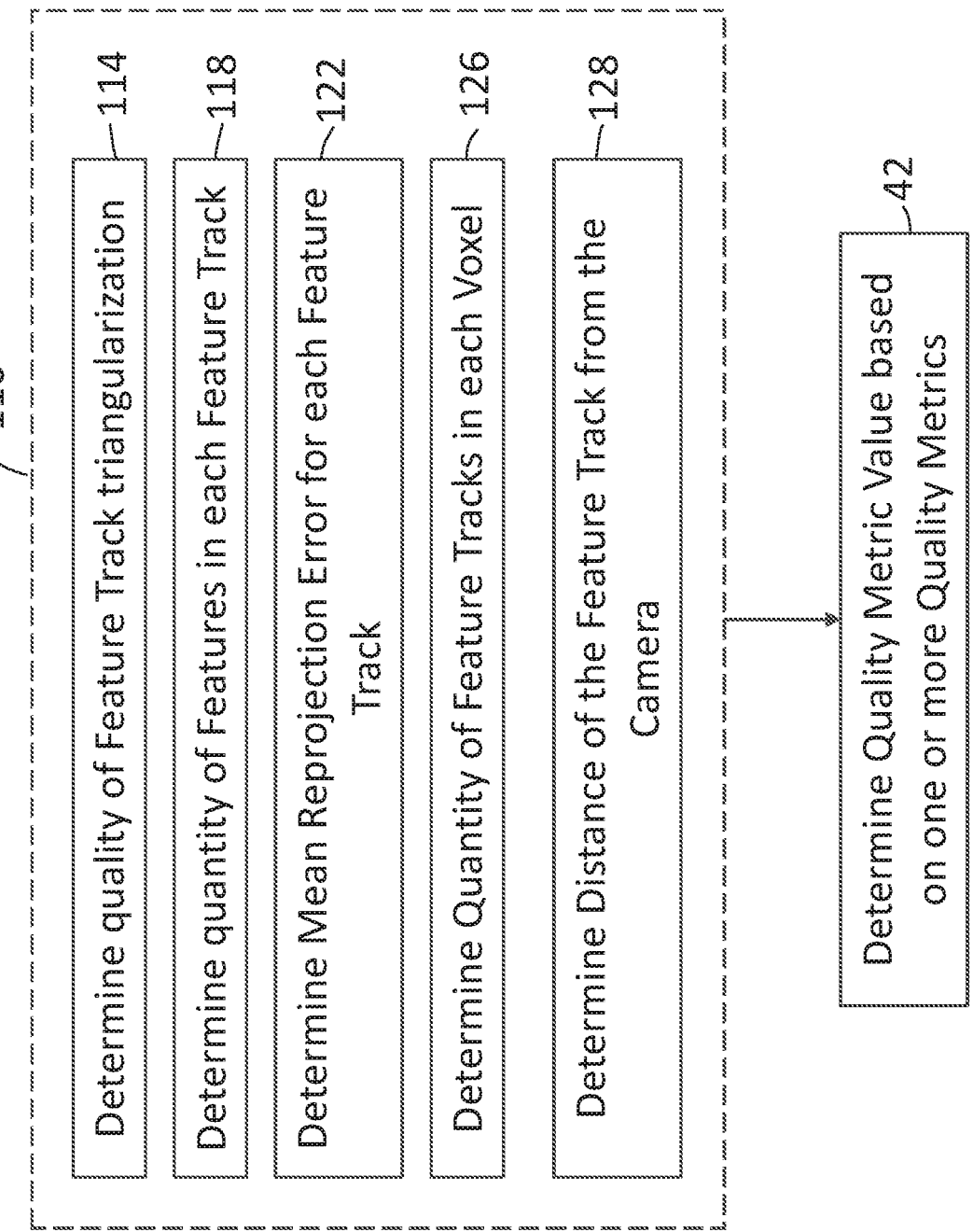
FIG. 10 is a process flow diagram of an exemplary embodiment of a quality metric value determination method in accordance with the present disclosure.

FIG. 10 is a process flow chart depicting one embodiment of the step 46 for determining a quality metric value of each of the one or more feature track 12a-n assigned to a voxel 34. Generally, at least one quality metric 110 is assessed for each of the one or more feature track 12a-n assigned to a particular one of the voxels 34a-n to calculate a quality metric value (step 42). Assigning one or more feature tracks 12a-n to the voxel 34 may be accomplished by including the one or more feature tracks 12a-n in a dataset (or data file) correlated with the voxel 34. In some embodiments, the feature tracks 12a-n may be stored in a database. The database may have a voxel field that is configured to receive a voxel identifier indicative of a particular one of the voxels 34a-n. In these embodiments, the one or more feature tracks 12a-n can be assigned to the voxel 34 by storing the voxel identifier identifying the particular one of the voxels 34a-n in the voxel field. Similarly, the one or more feature tracks 12a-n can be removed from a particular one of the voxels 34a-n by deleting the voxel identifier from the voxel field, or removing the information describing the feature track 12 from the dataset or data file correlated with the voxel 34.

In one embodiment, the quality metric 110 may be determined based on at least one of: determining and/or receiving a feature track triangularization quality 114, determining and/or receiving a feature point quantity in the feature track 118, determining and/or receiving a mean reprojection error 122 for each feature track, determining and/or receiving a quantity of feature tracks in the voxel 126, and determining and/or receiving a distance of the feature track from the camera when an image 20 was taken 128. In one embodiment, determining the quality metric value 42 may be based on assessing any combination of more than one quality metric 110.

In one embodiment, any of a plurality of feature tracks 12 assigned to the voxel 34 is removed from the voxel 34 if the quality metric 110 is does not exceed a threshold. For example, if a feature track triangularization quality is below a triangularization quality threshold, then a particular feature track can be discarded or otherwise not used in the bundle adjustment process. The triangularization quality threshold may be supplied by a user through any of a plurality of user devices 104 or may be calculated by the computer system 30.

In one embodiment, the spatial filter method may determine whether sufficient observations are provided in a particular one of the feature tracks 12a-n in a particular one of the voxels 34a-n. This can be accomplished by removing and/or not using in the bundle adjustment process any of a plurality of feature tracks 12 assigned to the voxel 34 if a feature point quantity 118 does not exceed a feature point quantity threshold. A feature point quantity is the quantity of feature points 12' in feature track 12. The feature point quantity threshold may be supplied by a user through any of a plurality of user devices 104 or may be calculated by the computer system 30.

In one embodiment, a mean reprojection error 122 for a feature track 12a-n may be calculated by determining a mean of the Euclidian distance between a reprojection point and a feature point 12' of each feature point 12' in the feature track 12. The reprojection point may be determined by using the metadata of each image 20a-n to project the feature track 12 geographic coordinate onto an image 20. The Euclidian distance in each image 20 is the distance between the location of the reprojection point on the image 20 and the location of the feature point 12' in the image 20.

In one embodiment, each of the plurality of feature tracks 12 assigned to a particular one of the voxels 34a-n is assigned a reprojection quality. The reprojection quality may be determined by the formula: $Quality_{reproj} = N_{fpts} - E_{reproj,mean}$, where $N_{fpts}$ is the number of feature points 12' in feature track 12 and $E_{reproj,mean}$ is the mean reprojection error 122. Any of the plurality of feature tracks 12 with a reprojection quality not exceeding a threshold may be removed from voxel 34 where the reprojection quality threshold may be supplied by a user through any of a plurality of user devices 104 or may be calculated by the computer system 30.

In one embodiment, the feature track quantity is calculated by calculating the number of feature tracks 12a-n in a particular one of the voxels 34a-n. The feature track quantity threshold may be supplied by a user through any of a plurality of user devices 104 or may be calculated by the computer system 30. The feature track quantity threshold may include an upper feature track quantity threshold, a lower feature track quantity threshold, or both. In a first embodiment, if the feature track quantity exceeds the upper feature track quantity threshold, then the quantity of feature tracks 12 that exceed the upper feature track quantity threshold may be removed from voxel 34. In a second embodiment, if the feature track quantity does not exceed the lower feature track quantity threshold, it is determined that insufficient observations exist, and all of the feature tracks 12a-n in the voxel 34 are either not used in the bundle adjustment process or are removed from voxel 34.

In one embodiment, if a feature track quantity exceeds a feature track quantity threshold, the plurality of feature tracks 12a-n in a voxel 34 are sorted in order from highest reprojection quality to lowest reprojection quality. The feature track 12a-n with the lowest reprojection quality are then removed from voxel 34 until the quantity of feature tracks 12a-n in voxel 34 is equal to the feature track quantity threshold. This ensures that the feature tracks 12a-n that are used in the bundle adjustment process have the highest quality.

Figure 11A:
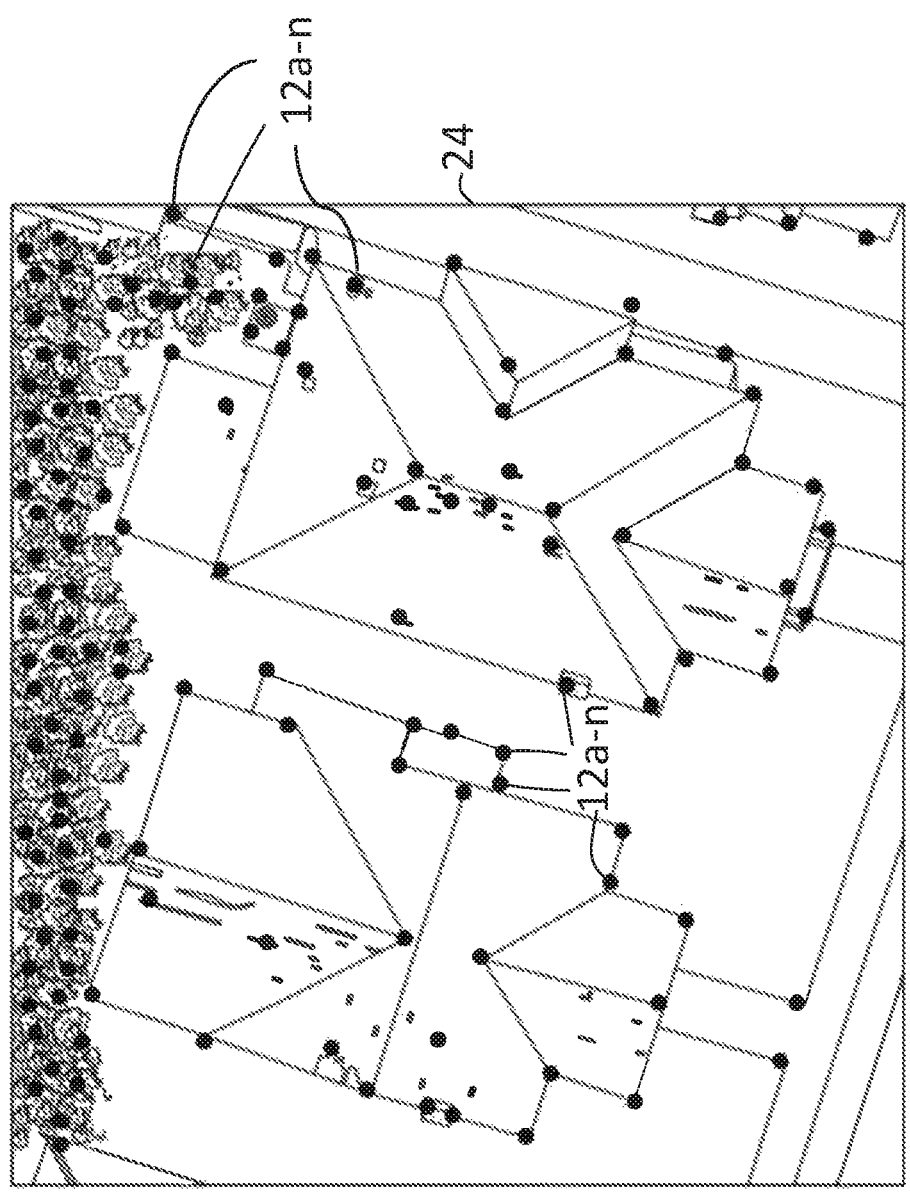
FIG. 11A is an exemplary illustration of a plurality of feature tracks plotted on the same geographic area as in FIG. 2 before implementing a voxel filter.

FIG. 11A shows an exemplary plurality of feature tracks 12a-n mapped on a geographic area 24 before applying the spatial filter method 10. Therefore, the plurality of feature tracks 12a-n is not spatially distributed over the geographic area 24. Areas with a plurality of feature tracks 12a-n near other identical or similar feature tracks 12a-n such as the region of vegetation 58 or the plurality of roof flaws 66 increases the likelihood of bad matches, which results in a lower than average mean reprojection error 122. A low mean reprojection error results in a low-quality and non-spatially distributed sparse point solution to bundle adjustment. The solution for a high-quality and spatially distributed set of feature tracks 12 is the spatial filter method 10.

Figure 11B:
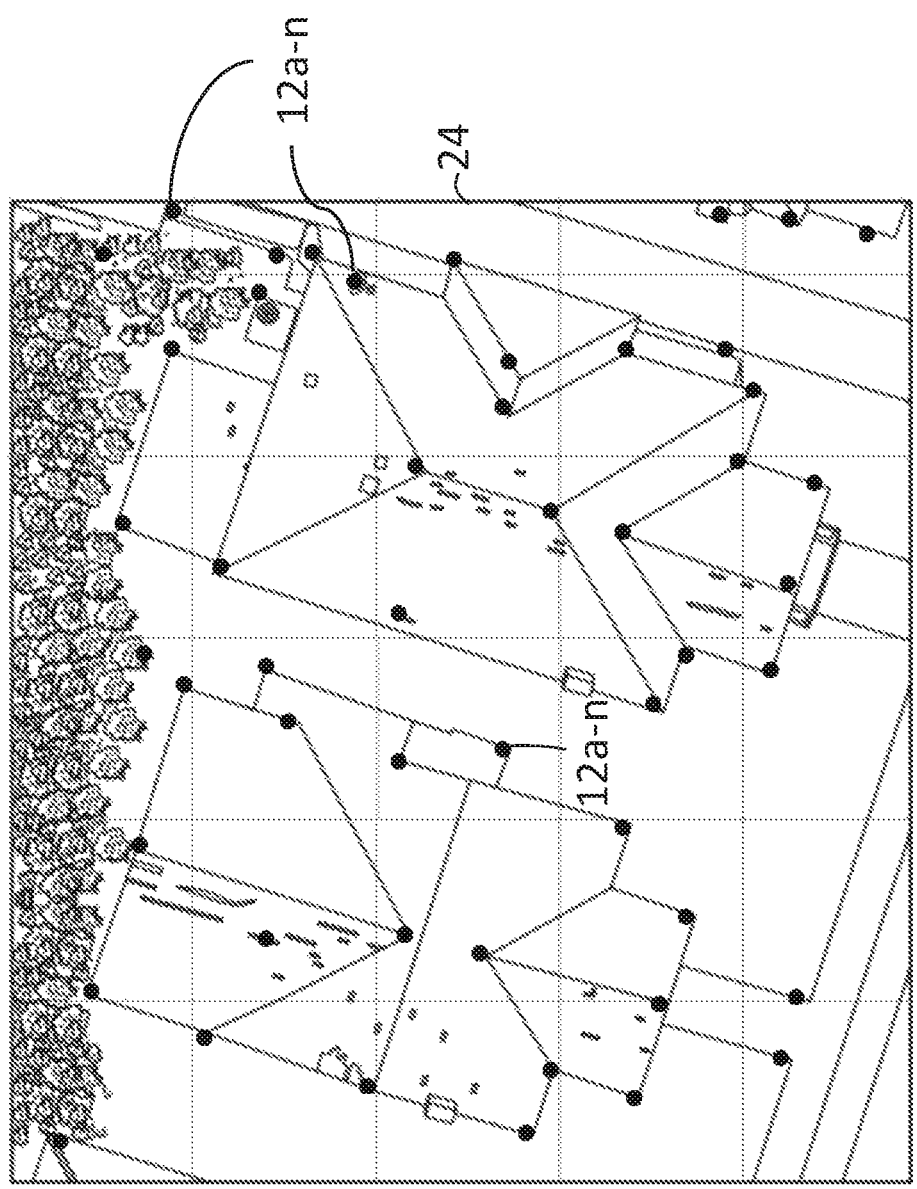
FIG. 11B is an exemplary illustration of a plurality of feature tracks plotted on the voxelated geographic area as in FIG. 9 after implementing a voxel filter.

As shown in FIG. 11B, in one embodiment, the plurality of feature tracks 12a-n are assigned to voxels 34a-n (step 38) and are filtered based on the determined quality match metric value 42 (step 46) to create a spatially distributed sub-set of the plurality of feature tracks 12a-n over the geographic area 24. A bundle adjustment is then conducted on the plurality of feature tracks 12a-n in the spatially distributed sub-set of feature tracks (step 50). By automating the selection of feature tracks based on a voxelated geographic area and filtering the feature tracks based on a quality metric value, the spatial filter method 10 results in a faster, spatially distributed, and high-quality bundle adjustment.

Figure 12:
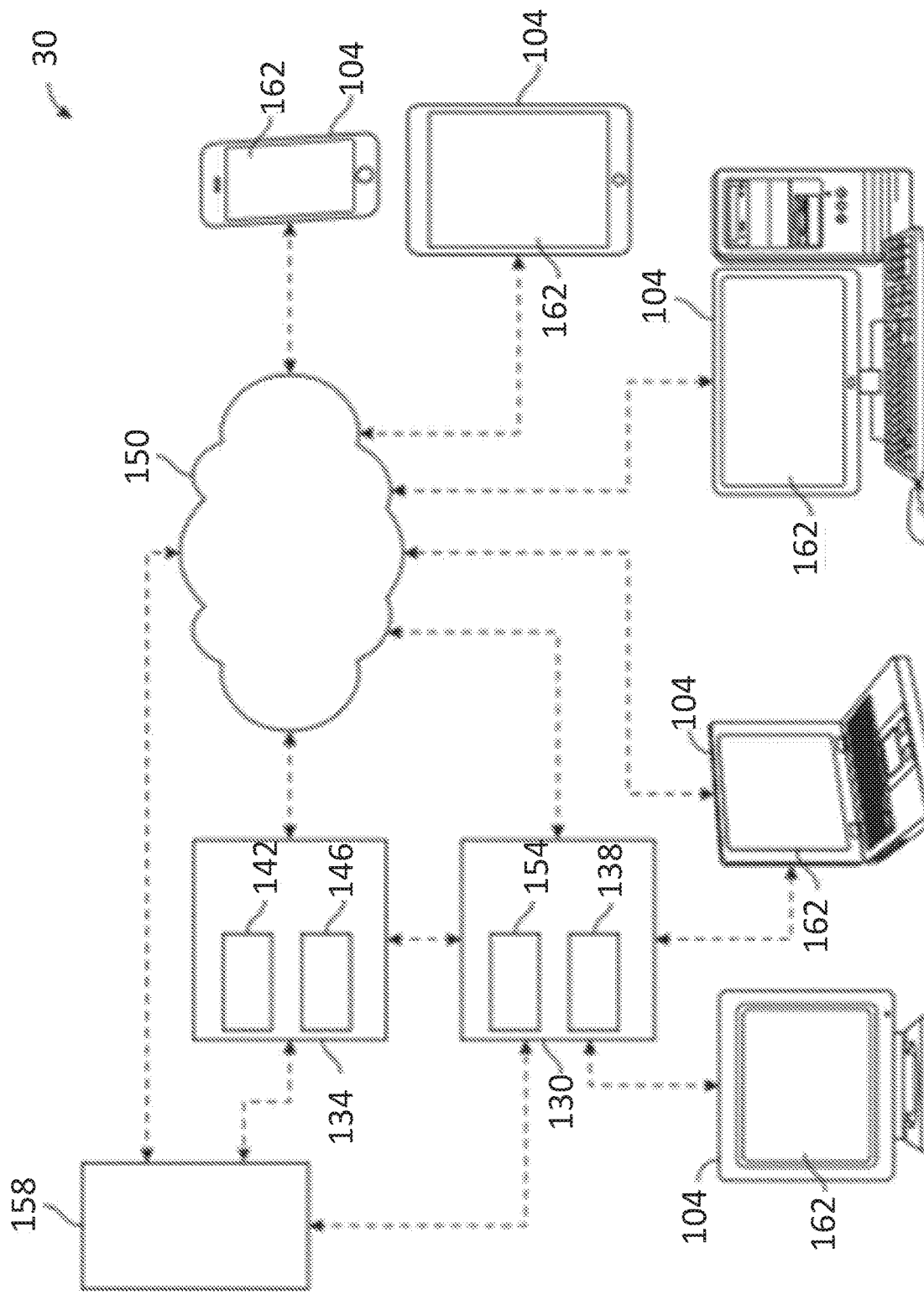
FIG. 12 is a schematic of an exemplary computer system in accordance with the present disclosure.

In one embodiment, as shown in FIG. 12, the spatial filter method 10 may be carried out on one or more computer system 30. The computer system 30 may comprise one or more computer processor 130, one or more non-transitory memory 134, and one or more communication component 138. The memory 134 may store one or more database 142 and program logic 146. The one or more database may comprise the digital images 20 and/or other data. Though it will be understood that the digital images 20 may be provided from outside sources and/or stored elsewhere. The computer system 30 may bi-directionally communicate with a plurality of user devices 104, which may or may not have one or more screens 162, and/or may communicate via a network 150. The processor 130 or multiple processors 130 may or may not necessarily be located in a single physical location.

In one embodiment, a non-transitory computer-readable storage medium 154 stores program logic, for example, a set of instructions capable of being executed by the one or more processor 130, that when executed by the one or more processor 130 causes the one or more processor 130 to carry out the spatial filter method 10.

In one embodiment, the network 150 is the Internet and the user devices 104 interface with the system via the communication component 138 and a series of web pages. It should be noted, however, that the network 150 may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

From the above description and examples, it is clear that the inventive concepts disclosed and claimed herein are well adapted to attain the advantages mentioned herein. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein. For instance, although a geographic area that includes man-made objects, non-exclusive examples of which include buildings and infrastructure including roads, bridges, utility lines, pipelines, utility towers, may be used as an example, the methods and systems may be used to reduce the bundle adjustment block size of a plurality of images of any feature, including natural or non-man-made features, and/or to create a point cloud based on the resulting bundle adjustment and/or to create a model based on the resulting bundle adjustment. The resulting point cloud and/or model has a multitude of uses, such as, but not limited to, creating 2D and/or 3D models of features, structures, and/or components depicted in the images 20; measuring features, structures, and/or components depicted in the images 20; assessing the condition of measuring features, structures, and/or components depicted in the images 20; and/or determining the existence of features, structures, and/or components depicted in the images 20. In one embodiment, the Also, it is to be understood that the phraseology and terminology employed herein is for purposes of description and should not be regarded as limiting.

What is claimed is:

1. A method, comprising:
    assigning a plurality of feature tracks to a voxel corresponding to a region of a geographic area, the voxel having a length, a width, and a height, each feature track including a geographic coordinate within the region, a first image identifier identifying a first image, a second image identifier identifying a second image, a first pixel coordinate identifying a first location of a first feature in the first image, and a second pixel coordinate identifying a second location of the first feature within the second image;
    determining a quality metric value of each of the feature tracks assigned to the voxel;
    creating a subset of the feature tracks by determining whether a quantity of feature tracks assigned to the voxel exceeds a feature track quantity threshold, and assigning highest quality feature tracks to the subset based on the quality metric value; and
    conducting bundle adjustment on the subset of the feature tracks assigned to the voxel.

2. The method of claim 1, further comprising sorting the feature tracks assigned to the voxel by the quality metric value.

3. The method of claim 1, wherein determining the quality metric value comprises:
    determining a feature track triangularization quality.

4. The method of claim 1, wherein determining the quality metric value comprises:
    determining a feature point quantity in the feature track.

5. The method of claim 1, wherein determining the quality metric value comprises:
    determining a quantity of feature tracks in the voxel.

6. The method of claim 1, wherein determining the quality metric value comprises:
    determining a distance of each of the feature tracks from a camera.

7. The method of claim 1, further comprising:
    creating a point cloud based on results of the bundle adjustment.

8. A method, comprising:
    assigning a plurality of feature tracks to a voxel corresponding to a region of a geographic area, the voxel having a length, a width, and a height, each feature track including a geographic coordinate within the region, a first image identifier identifying a first image, a second image identifier identifying a second image, a first pixel coordinate identifying a first location of a first feature in the first image, and a second pixel coordinate identifying a second location of the first feature within the second image;
    determining a quality metric value of each of the feature tracks assigned to the voxel; wherein determining the quality metric value comprises: determining a mean reprojection error for each feature track by determining a mean of the Euclidian distance between a reprojection point and a feature point of each feature point in the feature track; wherein the reprojection point is determined using metadata of each image to project the feature track geographic coordinate onto the image; and wherein the Euclidian distance is a distance between a location of the reprojection point on the image and the location of the feature point in the image; and conducting bundle adjustment on a subset of the feature tracks assigned to the voxel, the subset of the feature tracks based on the quality metric value.

9. A computer system, comprising:

one or more processors; and one or more non-transitory computer readable medium storing computer executable instructions that when executed by the one or more processors cause the one or more processors to:

assign a plurality of feature tracks to a voxel corresponding to a region of a geographic area, the voxel having a length, a width, and a height, each feature track including a geographic coordinate within the region, a first image identifier identifying a first image, a second image identifier identifying a second image, a first pixel coordinate identifying a first location of a first feature in the first image, and a second pixel coordinate identifying a second location of the first feature within the second image;

determine a quality metric value of each of the feature tracks assigned to the voxel;

create a subset of feature tracks by determining whether a quantity of feature tracks assigned to the voxel exceeds a feature track quantity threshold, and assign highest quality feature tracks to the subset based on the quality metric value; and conduct bundle adjustment of the subset of the feature tracks assigned to the voxel.

10. The computer system of claim 9, further comprising computer executable instructions that when executed by the one or more processors cause the one or more processors to sort the feature tracks assigned to the voxel by quality metric value.

11. The computer system of claim 9, wherein determining the quality metric value comprises:

determining a feature track triangularization quality.

12. The computer system of claim 9, wherein determining the quality metric value comprises:

determining a feature point quantity in the feature track.

13. The computer system of claim 9, wherein determining the quality metric value comprises:

determining a quantity of feature tracks in the voxel.

14. The computer system of claim 9, wherein determining the quality metric value comprises:

determining a distance of each of the feature tracks from a camera.

15. The computer system of claim 9, further comprising computer executable instructions that when executed by the one or more processors cause the one or more processors to:

creating a point cloud based on results of the bundle adjustment.

16. A computer system, comprising:

one or more processors; and one or more non-transitory computer readable medium storing computer executable instructions that when executed by the one or more processors cause the one or more processors to:

assign a plurality of feature tracks to a voxel corresponding to a region of a geographic area, the voxel having a length, a width, and a height, each feature track including a geographic coordinate within the region, a first image identifier identifying a first image, a second image identifier identifying a second image, a first pixel coordinate identifying a first location of a first feature in the first image, and a second pixel coordinate identifying a second location of the first feature within the second image;

determine a quality metric value of each of the feature tracks assigned to the voxel; wherein determining the quality metric value comprises: determining a mean reprojection error for each feature track by determining a mean of the Euclidian distance between a reprojection point and a feature point of each feature point in the feature track; wherein the reprojection point is determined using metadata of each image to project the feature track geographic coordinate onto the image; and wherein the Euclidian distance is a distance between a location of the reprojection point on the image and the location of the feature point in the image; and conduct bundle adjustment of a subset of the feature tracks assigned to the voxel, the subset of the feature tracks being based on the quality metric values.

* * * * *

UNITED STATES PATENT AND TRADEMARK OFFICE
CERTIFICATE OF CORRECTION

PATENT NO.        : 11,443,452 B2
APPLICATION NO.   : 16/895858
DATED             : September 13, 2022
INVENTOR(S)       : David R. Nilosek, Vincent Caux-Brisebois and Phillip Salvaggio It is certified that error appears in the above-identified patent and that said Letters Patent is hereby corrected as shown below:

In the Specification
Column 1, Lines 33-34: Delete "and w, 4, and K rotational" and replace with -- and ω, Ø, and κ rotational --

Signed and Sealed this
Fifteenth Day of November, 2022

Katherine Kelly Vidal
*Director of the United States Patent and Trademark Office*